United States Patent Office 3,434,207
Patented Mar. 25, 1969

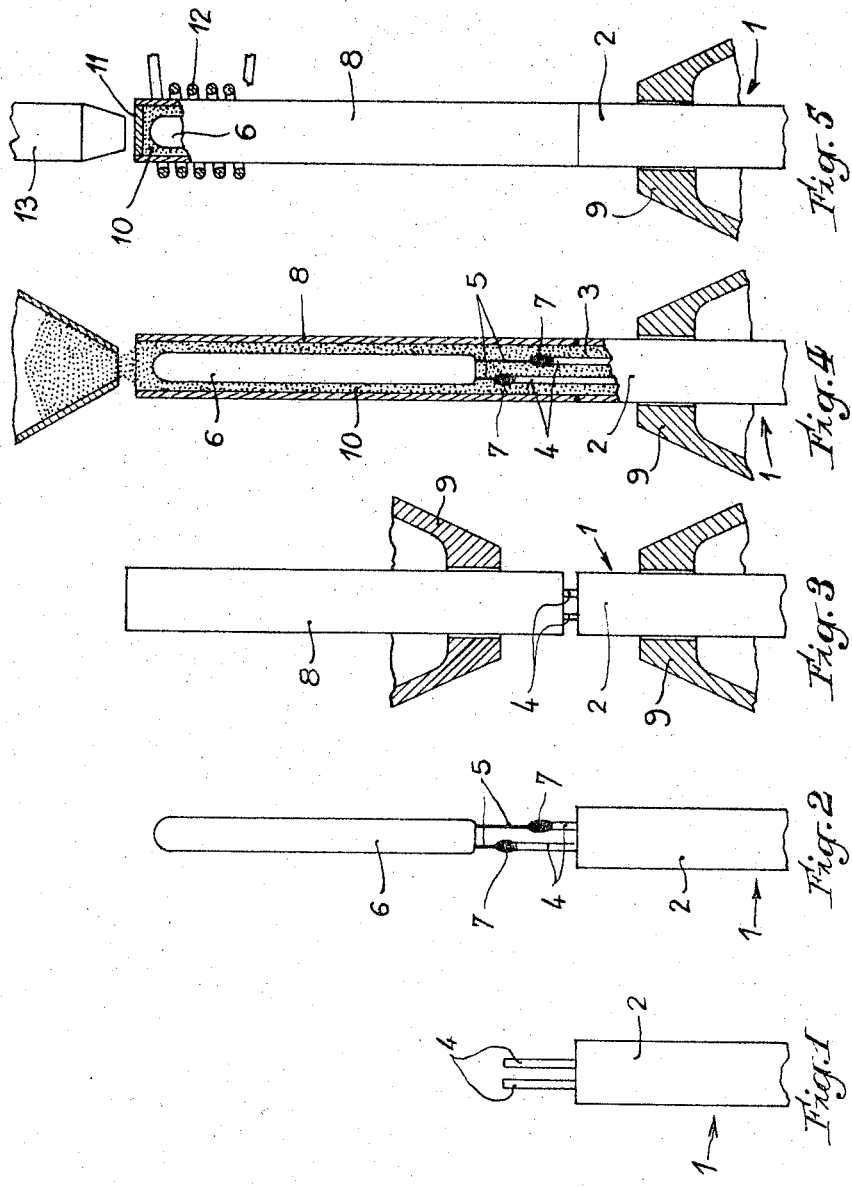

3,434,207
PROCESS FOR MAKING PYROMETRIC PROBES OR RODS
Marc Frachon, Saint-Genis-Laval, France, assignor to Coreci, Compagnie de Regulation et de Controle Industriel, Lyon, Rhone, France, a French joint-stock company
Filed Jan. 31, 1967, Ser. No. 612,946
Claims priority, application France, Feb. 4, 1966, 46,905
Int. Cl. H01c 7/04
U.S. Cl. 29—612
4 Claims

ABSTRACT OF THE DISCLOSURE

An elongated resistive temperature responsive element is secured by its connecting wires to the protruding ends of the inner conductors of a cable formed of a tubing filled with pulverulent refractory material in which the conductors are embedded. A length of tube is welded to the end of the cable tubing to form an extension thereof enclosing the element. The length of tube is filled with pulverulent refractory material and its outer end is closed by a disk welded in position.

---

The present invention relates to pyrometric probes or rods for high temperatures, as for instance 800° C. or more, and it has for its object to provide a pyrometric probe or rod which will be simple in construction and which will dispense with the delicate and expensive measuring equipment required by thermocouple probes owing to their quite small E.M.F.

In accordance with the present invention a pyrometric probe or rod comprises a cable formed of a plain-walled heat-resistant metallic tubing filled with a highly compressed mass of a pulverulent insulating material in which are embedded conductors having exposed protruding portions at one end of the cable, an elongated resistive temperature responsive element having connecting wires secured to the said protruding portions of the inner conductors of the cable, the outer diameter of the said element being substantially smaller than the outer diameter of the said tubing, a length of a heat-resistant metallic tube in which the said element is enclosed, this length of tube being disposed substantially in line with the said tubing, and having an outer diameter substantially equal to the outer diameter of the tubing and an inner diameter substantially larger than the outer diameter of the said element, the said length of tube being tightly secured to the adjacent end of the said tubing so as to form an extension thereof, a second mass of a pulverulent insulating refractory material within the said length of tube to fill the latter while embedding the said element and maintaining it spaced from the wall of the length of tube, and a disk tightly secured to the outer end of the length of tube to close the latter.

The invention further concerns a method for the manufacture of such a pyrometric probe or rod which consists in exposing a portion of the inner conductors at one end of a cable formed of a plain-walled heat-resistant metallic tubing filled with a highly compressed mass of a pulverulent insulating refractory material in which the said inner conductors are embedded, in securing to the exposed portions of the inner conductors an elongated resistive temperature responsive element having an outer diameter substantially smaller than the outer diameter of the tubing of the cable, in enclosing the said element in a length of of a heat-resistant metallic tube disposed substantially in line with the tubing of the cable, and having an outer diameter substantially equal to the outer diameter of the tubing and an inner diameter substantially larger than the outer diameter of the said element, in tightly securing one end of the said length of tube to the adjacent end of the tubing of the cable so as to form an extension thereof, in filling the said length of tube with a second mass of a pulverulent insulating refractory material so as to embed the said element and to maintain it spaced from the wall of the length of tube, and in tightly closing the outer end of the length of tube.

In the accompanying drawings:

FIG. 1 shows the end of the cable of a pyrometric probe or rod according to the invention.

FIG. 2 shows this end with the connecting wires of the resistive temperature responsive element welded to the protruding portions of the inner conductors of the cable.

FIG. 3 illustrates the end of the cable with a length of tube disposed in line with the tubing of the cable so as to enclose the temperature responsive element.

FIG. 4 shows the parts with the length of tube filled with a pulverulent insulating refractory material.

FIG. 5 shows the pyrometric probe or rod during the welding of the disk to the outer end of the length of tube.

As above-mentioned the cable 1 of the probe comprises an outer plain-walled metallic tubing or sheath 2 made of an appropriate heat-resistant metal and filled with a highly compressed mass 3 (see FIG. 4) of a pulverulent insulating refractory material, as for instance magnesium oxide, in which are embedded heat-resistant electric conductors 4. Conductors 4 are first exposed at the end of the cable by cutting a short length of the sheath 1 and by eliminating the insulating mass 3 around the conductors. The end of cable 1 then appears as illustrated in FIG. 1. To the ends of conductors 4 are then welded the ends of the connecting wires 5 of a resistive temperature responsive element 6 (FIG. 2) having an outer diameter substantially lower than the outer diameter of the tubing or sheath 1. This element may comprise an elongated refractory core, made for instance of heat agglomerated aluminum oxide and having grooves in which is disposed a spirally wound wire of a refractory metal, such as platinum, the winding being covered with a protective layer of an alumina cement. There is thus obtained the assembly shown in FIG. 2. It will be remarked that one of the exposed conductors 4 has been cut shorter than the other one in order to avoid that the welds 7, which are always of larger diameter with respect to the conductors or wires, should be situated in the same transverse plane and liable therefore to contact each other during operation of the pyrometric probe.

The temperature responsive element 6 is next enclosed in a length of tube 8 (FIG. 3) made of a heat-resistant metal which may be the same as the metal of the tubing or sheath 1, the outer diameter of this length of tube being substantially equal to the outer diameter of the said sheath or tubing, while its inner diameter is substantially larger than the outer diameter of element 6. The tubing 1 and the length of tube 8 are clamped in the conducting jaws 9 of a resistance welding machine and they are welded to each other, the length of tube forming an extension of the tubing. Pulverulent insulating refractory material is then poured into the open end of the length of tube while the latter is submitted to a vibrating process. There is thus obtained a relatively compressed mass 10 which wholly fills the length of tube 8 while embedding the protruding ends of conductors 4, the wires 5 and the element 6, as illustrated in FIG. 6. Of course the material used to form this mass 10 may be magnesium oxide, as for the mass 3 which fills the sheath or tubing 1.

The free end of the length of tube 8 is then closed by means of a disk 11. For this purpose the end zone of the length of tube is first heated by means of a high frequency coil 12 (FIG. 5) in order to eliminate gases from mass 10 in this zone and while the tube is at a high temperature, the said disk 11 is welded by means of a powerful electric arc of short duration between the disk and a welding electrode 13.

There is finally obtained a pyrometric probe or rod which may be easily used up to temperatures of about 800° C. or more without any damage and without any change in the response of the temperature responsive element 6. The measure may be directly effected by means of a conventional Wheatstone bridge, as against thermocouple pyrometers which, owing to their quite small E.M.F., require an elaborate and delicate measuring equipment for the same range of temperature.

It is obvious that the temperature coefficient of the winding of the temperature responsive element 6 may be either positive or negative.

I claim:

1. A process for the manufacture of a pyrometric probe or rod, which consists in exposing a portion of the inner conductors at one end of a cable formed of a plain-walled heat-resistant metallic tubing filled with a highly compressed first mass of a pulverulent insulating refractory material in which said conductors are embedded; in securing to said exposed portions the connecting wires of an elongated resistive temperature responsive element having an outer diameter substantially smaller than the outer diameter of said tubing; in enclosing said elongated resistive temperature responsive element in a length of a heat-resistant metallic tube disposed substantially in line with said tubing and having an outer diameter substantially equal to the outer diameter of said tubing and an inner diameter substantially larger than the outer diameter of said temperature responsive element, said length of tube having a first and a second end; in tightly securing the first end of said length of tube to the adjacent end of said tubing so as to form an extension thereof; in filling said length of tube with a second mass of a pulverulent insulating refractory material to embed said temperature responsive element and to maintain same spaced from said length of tube; and in tightly closing the second end of said length of tube.

2. In a method as claimed in claim 1, said length of tube being secured to said tubing by electric resistance welding.

3. In a method as claimed in claim 1, closing said second end of said length of tube by means of a disk secured to said second end by arc welding.

4. In a method as claimed in claim 1, vibrating said length of tube to compress therein said second mass of pulverulent insulating refractory material.

References Cited

UNITED STATES PATENTS

| 1,213,881 | 1/1917 | Kearsley | 29—614 X |
| 2,933,805 | 4/1960 | McOrlly | 29—615 |
| 3,171,015 | 2/1965 | Grinde | 338—229 X |
| 3,267,733 | 8/1966 | Chambers | 338—28 X |
| 3,286,214 | 11/1966 | Kolb et al. | 338—28 X |
| 3,296,572 | 1/1967 | Kleven | 338—28 |

FOREIGN PATENTS

| 475,667 | 11/1937 | Great Britain. |

REUBEN EPSTEIN, *Primary Examiner.*

U.S. Cl. X.R.

338—238, 28; 29—615, 619